Aug. 11, 1964     W. KIRTLAND     3,143,841

COTTON PICK-UP TIRE

Filed Jan. 28, 1963

INVENTOR.
WILLIAM KIRTLAND
BY
Willard S. Grout
ATTORNEY

United States Patent Office 3,143,841
Patented Aug. 11, 1964

3,143,841
COTTON PICK-UP TIRE
William Kirtland, 5737 N. 4th St., Mesa, Ariz.
Filed Jan. 28, 1963, Ser. No. 254,197
4 Claims. (Cl. 56—28)

This invention pertains to a cotton pick-up tire and more particularly to a tire tread structure especially adapted to picking up cotton that has fallen to the ground following mechanical picking operations.

One of the objects of this invention is to provide a cotton pick-up tire which is simple in construction and durable and long lasting in operation.

Another object is to provide a cotton pick-up tire having a specially constructed tread adapted to both load carrying and cotton pick-up functions so as to promote long wear and efficient pick-up operations over substantially any type of ground surface encountered in cotton field operations.

Still another object is to provide a cotton pick-up tire having a ground contacting surface consisting of a plurality of tread surfaces separated by depressed cavities in which are fixed suitable cotton snaring and pick-up material, such as wire wool and the like, the cotton contacting surface of said snaring and pick-up material being recessed below the tread surfaces so that only the tread surfaces contact the ground surface in load carrying capacity to thus promote long life and continued high efficiency for the snaring and pick-up material.

Further features and advantages of this invention will appear from a detailed description of the drawings in which.

Figure 1:
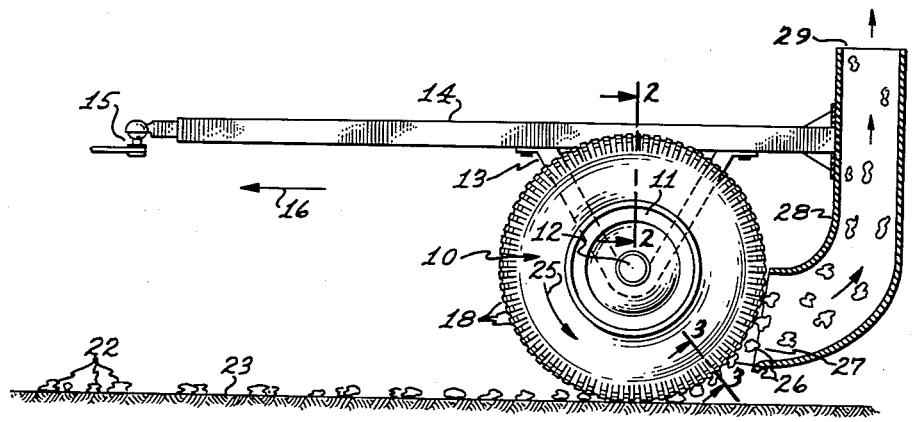
FIG. 1 is a side elevation showing the pick-up tire, incorporating the features of this invention, in actual use in the field.
Figure 4:
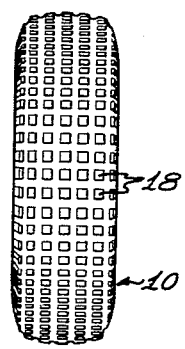
FIG. 4 is a plan view particularly showing the tire tread.
Figure 2:
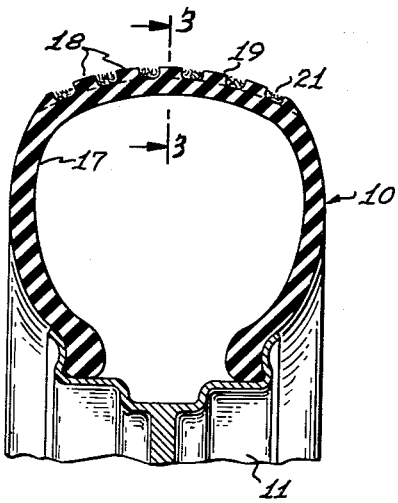
FIG. 2 is an enlarged fragmentary section on the line 2—2 of FIG. 1.
Figure 3:
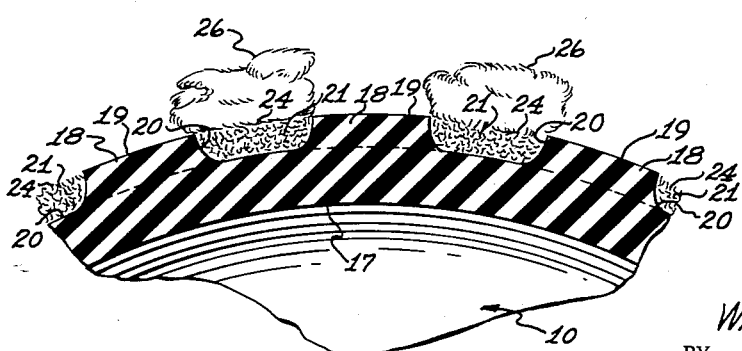
FIG. 3 is an enlarged fragmentary section on the line 3—3 of FIGS. 1 and 2.

As an example of one embodiment of this invention, there is shown, in FIG. 1, a pick-up tire 10 which may be carried on the usual drop-center rim 11 suitably journaled on an axle shaft 12 carried on the bracket 13 of the towing frame 14 which may be connected by a suitable hitch 15 to a towing vehicle, not shown, for movement in the direction of the arrow 16.

The carcass 17 is formed with a series of tread projections 18 of any suitable and desired configuration. Each of the tread projections have the ground contacting and load bearing surfaces 19 which provide the sole means to support the weight of the towing frame and associated apparatus carried by the frame. In the tread cavities 20 between the load bearing surfaces 19 is fixed suitable cotton snaring and pick-up material 21 such, for example, as wire wool, matted hair and the like substances adhesively attached to or projecting outwardly from the tire tread cavity surfaces in which it may be imbedded and adapted to contact and snare fallen cotton 22 on the ground 23. It is important to note that the outer active pick-up surface 24 is recessed below the surface of road contact defined by the load bearing surfaces 19 of the tire tread so as to avoid crushing and deforming the pick-up material 21 as the tire rolls over the field. Further, this arrangement prevents crushing the cotton under load into the pick-up material making it difficult to remove from the pick-up tire tread. Thus, only light snaring contact is made by the pick-up material 21 with the cotton 22 as the tire passes over the ground 23.

As the tire rolls in the direction indicated by the arrow 25 the snared cotton at 26 picked up from the ground may be doffed from the tire at the area 27 by any suitable device such as the vacuum doffing tube fixed on the frame 14 connected at 29 to the suction of a suitable blower, not shown.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A pick-up tire tread construction comprising in combination:
   (a) a tire carcass
   (b) a series of tread projections formed on said carcass,
   (c) smooth solid ground contacting and load bearing surfaces formed on the outer ends of said tread projections providing the sole means to support the weight of the towing frame and associated apparatus carried by the frame,
   (d) tread cavity surfaces formed between said tread projections,
   (e) and snaring and pick-up material fixedly attached to and projecting from said tread cavity surface and limited thereto with the outer active pick-up surface of said pick-up material recessed below the surface of road contact defined by said smooth solid load bearing surfaces.

2. A pick-up tire tread construction comprising in combination:
   (a) a tire carcass
   (b) a series of tread projections formed on said carcass.
   (c) smooth solid ground contacting and load bearing surfaces formed on the outer ends of said tread projections providing the sole means to support the weight of the towing frame and associated apparatus carried by the frame,
   (d) tread cavity surfaces formed between said tread projections,
   (e) snaring and pick-up material fixedly attached to and projecting from said tread cavity surface and limited thereto with the outer active pick-up surface of said pick-up material recessed below the surface of road contact defined by said smooth solid load bearing surfaces,
   (f) said snaring and pick-up material being so confined to said tread cavity surfaces as to avoid crushing and deforming said pick-up material as the tire rolls over a field.

3. A pick-up tire tread construction comprising in combination:
   (a) a tire carcass
   (b) a series of tread projections formed on said carcass,
   (c) smooth solid ground contacting and load bearing surfaces formed on the outer ends of said tread projections providing the sole means to support the weight of the towing frame and associated apparatus carried by the frame,
   (d) tread cavity surfaces formed between said tread projections,
   (e) snaring and pick-up material fixedly attached to and projecting from said tread cavity surface and limited thereto with the outer active pick-up surface of said pick-up material recessed below the surface of road contact defined by said smooth solid load bearing surfaces, (f) said snaring and pick-up material being so positioned in said tread cavity surfaces so as to prevent crushing the crop material under load into the pick-up material to facilitate efficient removal from the pick-up tire tread.

4. A pick-up tire tread construction comprising in combination:
(a) a tire carcass
(b) a series of tread projections formed on said carcass,
(c) smooth solid ground contacting and load bearing surfaces formed on the outer ends of said tread projections providing the sole means to support the weight of the towing frame and associated apparatus carried by the frame,
(d) tread cavity surfaces formed between said tread projections,
(e) snaring and pick-up material fixedly attached to and projecting from said tread cavity surface and limited thereto with the outer active pick-up surface of said pick-up material recessed below the surface of road contact defined by said smooth solid load bearing surfaces,
(f) said snaring and pick-up material being so oriented within said tread cavity surfaces that only light snaring contact pressure is made by the pick-up material with the crop materials to be picked up as the tire rolls over the ground surface.

References Cited in the file of this patent
UNITED STATES PATENTS

| | | |
|---|---|---|
| 1,214,490 | Ford | Jan. 30, 1917 |
| 1,650,796 | Kellogg | Nov. 29, 1927 |
| 2,542,871 | Johnson | Feb. 20, 1951 |
| 2,925,112 | Seaman | Feb. 16, 1960 |